(12) United States Patent
Caulkins (10) Patent No.: US 8,838,903 B2
(45) Date of Patent: Sep. 16, 2014

(54) PRIORITY ORDERED MULTI-MEDIUM SOLID-STATE STORAGE SYSTEM AND METHODS FOR USE

(75) Inventor: Jason Caulkins, West Windsor, NJ (US)

(73) Assignee: Dataram, Inc., Bellevue, WA (US)

( * ) Notice: Subject to any disclaimer, the term of this patent is extended or adjusted under 35 U.S.C. 154(b) by 520 days.

(21) Appl. No.: 12/700,206

(22) Filed: Feb. 4, 2010

(65) Prior Publication Data

US 2011/0191523 A1    Aug. 4, 2011

(51) Int. Cl.
    *G06F 12/12*    (2006.01)
    *G06F 12/08*    (2006.01)

(52) U.S. Cl.
    CPC .......... *G06F 12/121* (2013.01); *G06F 12/0868* (2013.01); *G06F 12/123* (2013.01); *G06F 2212/214* (2013.01); *G06F 12/0866* (2013.01)
    USPC ........... 711/133; 711/136; 711/159; 711/160; 711/E12.071

(58) Field of Classification Search
    None
    See application file for complete search history.

(56) References Cited

U.S. PATENT DOCUMENTS

| | | | |
|---|---|---|---|
| 6,292,808 B1 | 9/2001 | Obermarck et al. | |
| 6,801,994 B2 * | 10/2004 | Beckert et al. | 711/207 |
| 7,552,284 B2 * | 6/2009 | Petev et al. | 711/130 |
| 2003/0160796 A1 * | 8/2003 | Lavelle et al. | 345/557 |
| 2005/0204107 A1 | 9/2005 | Narayan et al. | |
| 2009/0077408 A1 | 3/2009 | Wong | |
| 2009/0172286 A1 | 7/2009 | Lasser et al. | |
| 2009/0300269 A1 | 12/2009 | Radke et al. | |
| 2010/0293337 A1 * | 11/2010 | Murphy et al. | 711/136 |
| 2011/0093654 A1 * | 4/2011 | Roberts et al. | 711/105 |

* cited by examiner

*Primary Examiner* — Christian P Chace
*Assistant Examiner* — Eric Loonan
(74) *Attorney, Agent, or Firm* — Donald R. Boys; Central Coast Patent Agency, Inc.

(57) ABSTRACT

A hierarchical data-storage system has a volatile storage medium, a first non-volatile storage medium, and a controller including a ranking engine tracking data writes to each of the memory mediums. Each medium is associated with a pre-set capacity threshold, and the controller, upon the volatile medium reaching its pre-set threshold, identifies one or more blocks of data as least-frequently written to the volatile medium, copies the data in those blocks to the non-volatile medium, and marks those blocks as available for new data writes, and the controller, upon the non-volatile medium reaching its pre-set threshold, identifies one or more blocks of data as least-frequently written to the non-volatile medium, and marks those blocks as available for new data writes from the volatile medium.

16 Claims, 5 Drawing Sheets

Logical Memory Blocks

400

| Data 0 | Metadata 0 |
|---|---|
| Data 1 | Metadata 1 |
| Data 2 | Metadata 2 |
| ⋮ | |
| ⋮ | |
| Data n | Metadata n |
| Free | |
| Free | |

RAM

*Fig. 4*

Logical Memory Blocks

500

| Data A | Metadata A |
|---|---|
| ⋮ | |
| ⋮ | |
| Data Y | Metadata Y |
| Data Z | Metadata Z |
| Free | |
| Free | |
| Free | |

SLC Flash/MLC Flash/Other

| RLBA | SLC/FLBA | MLC/FLBA | WC |
|---|---|---|---|
| x | | | 01 |
| | x | | 01 |
| | | x | 01 |
| | x | | 02 |
| x | | | 02 |
| x | | | 03 |
| | x | | 03 |
| x | | | 04 |
| | | | |

LFW Table

PRIORITY ORDERED MULTI-MEDIUM SOLID-STATE STORAGE SYSTEM AND METHODS FOR USE

CROSS-REFERENCE TO RELATED APPLICATIONS

N/A

BACKGROUND OF THE INVENTION

1. Field of the Invention

The present invention is in the field of solid-state data storage and pertains particularly to methods and apparatus for maintaining exclusive writes to non-volatile memory by off-loading least frequently written data to lower order non-volatile storage mediums.

2. Discussion of the State of the Art

In the field of data storage, non-volatile mechanical disk drives have been developed for short and long-term data storage. Solid-state non-volatile memory has been implemented for specific data storage needs, especially in small portable electronic computing devices such as cellular telephones, video cameras and the like. Volatile memory is a solid state memory typically used as a high-speed temporary memory such as random access memory (RAM) of which there are many known variations. Common versions of RAM include Dynamic Random Access Memory (DRAM) and Static Random Access Memory (SRAM) among other variations such as SDRAM.

Flash memory, on the other hand, is a solid state high-speed data storage medium that has, until recently, been reserved mainly for handheld devices like cell phones, personal digital assistants (PDAs), cameras, or Universal Serial Bus (USB) peripheral storage devices referred to as jump drives or thumb drives. Flash memory provides a non-volatile memory for storing data with read speeds approaching that of RAM. Common Flash memory types include various types of NOR and NAND Flash, each with distinct physical properties, densities and price points. For example, types of NAND flash may include Single-Level Cell (SLC) and Multi-Level Cell (MLC).

When referring to these memory types, the terms volatile and non-volatile are blurring as new research in memory continues and new memory types are developed. But for purpose of discussion, volatile memory shall refer to memory in which stored data is lost upon interruption of power and non-volatile memory shall refer to memory in which no power is required to retain the data stored. Increasingly, Flash memory is being used as primary or secondary storage memory in computing systems. Such devices are commonly known as solid state disks. Combinations of RAM and Flash are also being used as cache memory in some systems.

U.S. Pat. No. 7,464,240, issued to the inventor of the present application, includes a first portion of solid state memory of a volatile nature, a second portion of solid state memory of a non-volatile nature, a third portion of memory of a non-volatile nature, a controller for managing the memories, and a power subsystem for protecting data in volatile memory in the event of loss of power. The system is, in one embodiment, a transparent cache that is in-line with existing storage traffic. In another embodiment the system is recognized by a host system upon boot as a destination drive for reads and writes.

A controller is provided on the disk drive for managing the memory portions as a single non-volatile memory through use of at least one integrated circuit supporting one or more sets of machine-readable instructions and a data port and buffer circuitry for bi-directional communication of data between the controller and a host system such as a computer.

The system known to the inventor uses a RAM/Flash data storage addressing method that prevents continued and repetitive writing to Flash to preserve mean time before failure (MTBF) of the Flash storage device or devices of the system. The system uses RAM as a caching memory and only writes to Flash when absolutely necessary.

Another optimization of the system described above is rotation of Flash blocks in and out of service to further enhance wear leveling of the Flash device or aggregate of devices onboard or connected to the system. Writing to flash memory is comparatively slower than writing to RAM, hence the use of RAM in the above-described system to cache data for eventual write to Flash memory on power down, power interruption, or only when the RAM or primary Flash cache is full. The system described above provides a practical and economical solution for replacing mechanical hard disk drives in computers and other devices.

It has occurred to the inventor that there is a need for faster data management speeds in the computing industry in general and in particular in the area of robust servers and other business machines. While CPU speeds are at all time highs in terms of computing cycles, speeds at which data can be managed relative to disk storage on a Flash memory are still lagging behind. This has caused a barrier to the use of Flash extensively in more robust data storage systems.

Still another disadvantage of using flash as permanent storage in robust systems is that a number of writes performed on the memory is limited on a Flash memory chip, and the media must be written in a manner, often proprietary, as specified by the manufacturer of the Flash memory. Such adaptations may not be readily supported by a particular host system sending the data for storage. This fact has been a basis for differing approaches to flash management software and firmware that deal essentially with how data may be rendered and stored on the particular type Flash memory implemented.

Therefore, what is needed in the art is a combination volatile and non-volatile solid-state data storage system having hierarchically ordered storage mediums. A system such as this would solve the problem of over utilization of RAM to store data.

SUMMARY OF THE INVENTION

The problem stated above is that more efficiency in data writing is desirable for a solid-state storage system, but many of the conventional means for storing data, such as writing to random access memory, also creates inefficiency by least frequently written data occupying valuable random access memory. The inventors therefore considered functional components of a solid-state storage system, looking for elements that exhibit interoperability that could potentially be harnessed to provide efficient data writing and storage but in a manner that would not create unnecessary storage of least frequently written data stored in random access memory.

Every solid-state storage system is constrained by write efficiency, one by-product of which is a higher cost of adding sufficient random access memory to the system to maintain higher write speeds. Most such systems employ a mix of memory types to offset higher costs of using random access memory and combinations of volatile and non-volatile memories are typically a part of such apparatus.

The present inventor realized in an inventive moment that if, at the point of registering an incoming write request, least frequently written data could be copied and moved from faster memory to a lower cost slower memory while enabling continued writing to random access memory, faster write speeds could be maintained and less random access memory would be required for storing data in a large data storage system. The inventor therefore constructed a unique multi-tiered, hierarchical, solid-state data storage system for internal and external data storage that allowed computing hosts to write exclusively to random access memory, but constrained instances of least frequently written data from being maintained in random access memory. A significant reduction in occupied space in random access memory is achieved, with no impediment to write speed created.

Accordingly, in an embodiment of the present invention, a hierarchical data-storage system is provided, having a volatile storage medium, a first non-volatile storage medium, and a controller including a ranking engine tracking data writes to each of the memory mediums. Each medium is associated with a pre-set capacity threshold, and the controller, upon the volatile medium reaching its pre-set threshold, identifies one or more blocks of data as least-frequently written to the volatile medium, copies the data in those blocks to the non-volatile medium, and marks those blocks as available for new data writes, and the controller, upon the non-volatile medium reaching its pre-set threshold, identifies one or more blocks of data as least-frequently written to the non-volatile medium, and marks those blocks as available for new data writes from the volatile medium.

In one embodiment of the system the controller, prior to marking one or more blocks of the first non-volatile memory medium available for data writes, first copies the data in those blocks to a memory remote from the hierarchical memory system. Also in one embodiment the system includes a second non-volatile storage medium subordinate to the first non-volatile storage medium and associated with a capacity threshold, and the controller, upon the first non-volatile medium reaching its pre-set threshold, identifies one or more blocks of data as least-frequently written to the first non-volatile medium, copies the data in those blocks to the second non-volatile medium, and marks those blocks as available for new data writes, and the controller, upon the second non-volatile medium reaching its pre-set threshold, identifies one or more blocks of data as least-frequently written to the second non-volatile medium, and marks those blocks as available for new data writes from the first non-volatile medium.

In another embodiment the controller, prior to marking one or more blocks of the second non-volatile memory medium as available for data writes, first copies the data in those blocks to a memory remote from the hierarchical memory system. The first non-volatile storage medium may be a single-level cell (SLC) Flash memory, and the second non-volatile storage medium may be a multi-level cell (MLC) Flash memory.

The systems in embodiments of the invention may be implemented as external or internal drives. In some embodiments the controller associates metadata table entries to written data entries, the metadata entries including local block address information and current least-frequently-written data state of the associated data entry. Typically in embodiments of the invention least-frequently-written data is copied from any of the storage mediums is written to the next storage medium down in the hierarchy.

In another aspect of the invention a method for utilizing flash memory in a memory system is provided, comprising the steps of (a) making all memory writes in the system to a volatile memory while tracking frequency of identical data writes; (b) setting a capacity threshold for the volatile memory, and tracking the capacity of valid data in the volatile memory; (c) when the capacity reaches the threshold, identifying at least one block of most-frequently-written data, and copying that block or blocks to a first flash memory; and (d) marking the block or blocks copied as available to be written in the volatile memory.

In one embodiment of the method there are steps setting a capacity threshold for the first flash memory, tracking the capacity of valid data in the first flash memory, and when the capacity for the first flash memory reaches the threshold, identifying at least one block of most-frequently-written data, and marking the block or blocks copied as available to be written in the first flash memory. In another embodiment there is a second flash memory subordinate to the first flash memory, and there are further steps for setting a capacity threshold for the second flash memory, tracking the capacity of valid data in the second flash memory, and upon the first flash memory reaching its pre-set threshold, identifying one or more blocks of data as least-frequently-written to the first flash memory, copying the data in those blocks to the second flash memory, and marking those blocks as available for new data writes, and, upon the second flash memory reaching its pre-set threshold, identifying one or more blocks of data as least-frequently written to the second flash memory, and marking those blocks as available for new data writes from the first flash memory.

In some embodiments there may be steps for, prior to marking one or more blocks of the second non-volatile memory medium as available for data writes, first copying the data in those blocks to a memory remote from the hierarchical memory system.

The first flash memory may be a single-level cell (SLC) Flash memory, and the second flash memory may be a multi-level cell (MLC) Flash memory. The system may be implemented as either an external or an internal drive.

In some embodiments metadata table entries are associated to written data entries, the metadata table entries including local block address information and current least-frequently-written data state of the associated data entry. Typically the least-frequently-written data copied from any of the storage mediums is written to the next storage medium down in the hierarchy.

DETAILED DESCRIPTION

The inventors provide a hybrid multi-tiered, hierarchically-ordered, solid-state data storage system that enables one or more computing hosts to write data exclusively to volatile memory while moving least frequently used data down a hierarchy of memory chips when a higher-priority memory chip in the hierarchy is determined full. The methods and apparatus of the present invention are described in enabling detail using the following examples, which may represent more than one embodiment of the present invention.

Figure 1:
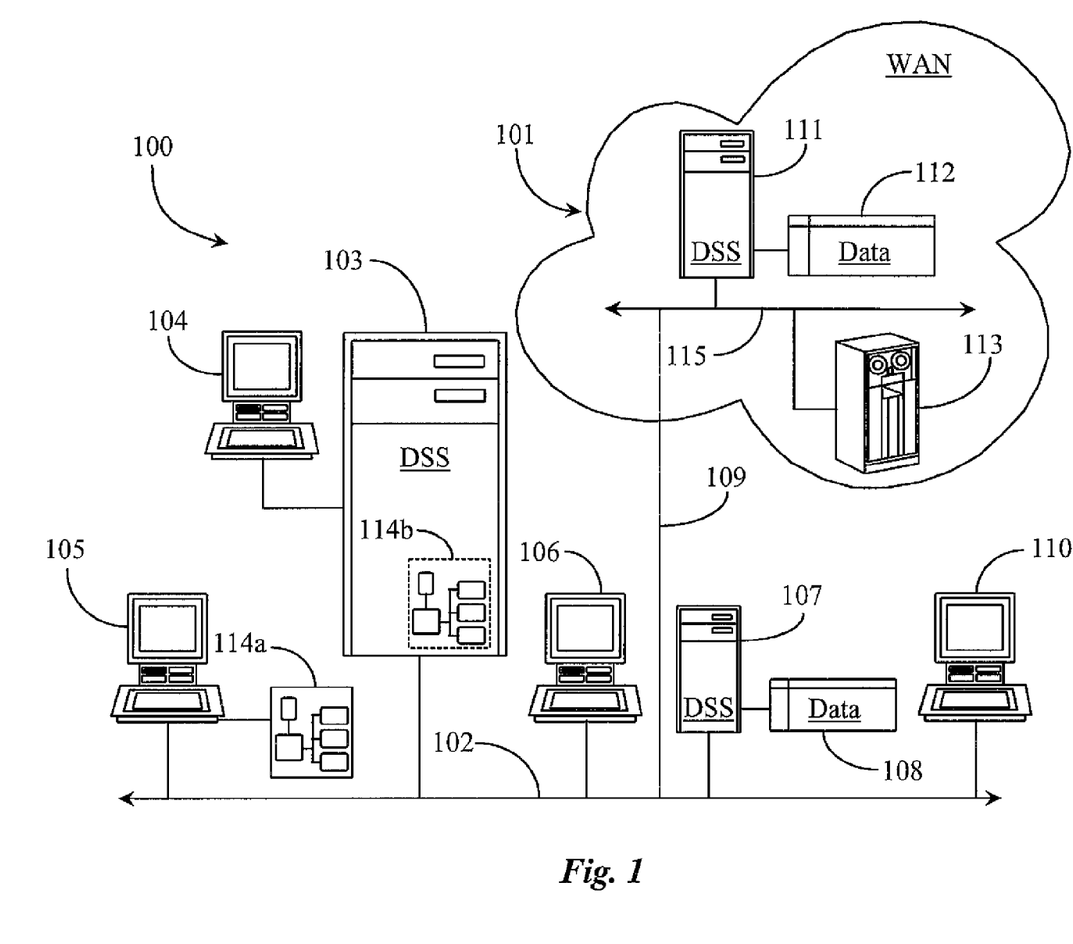
FIG. 1 is an architectural overview of a data storage network according to an embodiment of the present invention.

FIG. 1 is an architectural overview of a data storage network 100 according to an embodiment of the present invention. Data storage network 100 includes a local area network (LAN) 102 having connection to a wide-area-network (WAN) 101. LAN 102 may be an Ethernet LAN enhanced with transfer control protocol over Internet protocol (TCP/IP), or another data network suitable for practicing data storage using any one of several available disk protocols including serial advanced technology attachment (SATA), parallel advanced technology attachment (PATA), SCSI, Fibre Channel, and or the like protocols.

LAN 102 supports one or more computing host systems such as a computing host 105, a computing host 106, and a computing host 110. A computing host refers to any computerized appliance capable of writing data to a digital storage medium. In this example an enterprise data storage system (DSS) 103 is illustrated and is connected to LAN 102. DSS 103 represents an enterprise mass storage system and server. DSS 103 includes an administrative computing appliance coupled thereto for enabling administration of the server.

Computing host 105 is coupled to a hierarchically-ordered, multi-tiered, solid-state storage system 114a coupled thereto. Solid-state storage system 114a may be an internal solid-state disk drive or an external solid-state disk drive as illustrated in this example. DSS 103 includes a hierarchically ordered, multi-tiered, solid-state storage system 114b serving as an internal data storage system in this example. Storage system 114b may also be an external system without departing from the spirit and scope of the present invention. The difference between version a and version b of solid-state storage system 114 is storage capacity. Version 114b has sufficient storage capacity for application to enterprise systems while version 114a is configured as a storage system for one or a few host computing appliances like appliance 105.

Computing appliances that may serve as a host to solid-state storage system 114a include computing appliance 106 and computing appliance 110, which may share system 114a with host 105 or each computing appliance may include local internal or external solid-state systems such as system 114a.

Solid-state storage system 114a is a multi-tiered system, meaning that it includes more than one memory type. Solid-state storage system 114a has a volatile memory provided thereon and considered the top memory type in a hierarchy of onboard memory types. Volatile memory is, in a preferred embodiment, random access memory (RAM). There are many available types of RAM including dynamic RAM (DRAM), static RAM (SRAM) and static dynamic RAM (SDRAM) among others. RAM memory is the top memory in a hierarchal order of memories configured on solid-state storage system 114a and solid-state storage system 114b on DSS 103.

Solid-state storage system 114a and 114b include two or more Flash memories that are configured in the hierarchy under the RAM memory. For example, a single level cell (SLC) Flash memory and a multi-level cell (MLC) Flash memory may take position in the hierarchy under the RAM memory with the SLC chip higher in the hierarchy order than the MLC chip. A lower priority Flash memory may be provided onboard solid-state data storage system 114a and 114b that may be considered the lowest priority memory in the hierarchal order of memories. For the purposes of discussion the term memory may refer to one or more than one memory device or chip comprising one addressable memory type in the hierarchy of memories. Detail of the architecture of memories 114a and 114b is provided in FIG. 2 and description of FIG. 2 below, in which the volatile memory is element 201, the controller is element 205, and the flash memories are element numbers 202, 203 and 204.

LAN network 102 has connection to WAN 101 via a high-speed data access line 109. WAN 101 may be a private or corporate WAN or a public WAN such as the Internet network. WAN 101 is further characterized by a network backbone 115, which in the case of the Internet, represents all of the lines, equipment, and access point that make up the Internet network as a whole.

In a preferred embodiment, solid-state systems 114a and 114b are viewed by a host as a single solid-state memory. A memory controller (not illustrated) onboard system 114a and 114b manages reads and writes to the systems from the host or hosts coupled to the systems. The hierarchal order of memory devices on solid-state system 114a and 114b serves as a protocol base for moving least frequently written data down the hierarchy from memory to memory until it is eventually purged from system 114 (a,b) or offloaded from system 114 (a,b) to some external storage or archival system. An external data storage system (DSS) 107 is illustrated in this example and is adapted as an off-system storage medium for offloading data from solid-state system 114a or 114b. DSS 107 includes a data server coupled to a mass repository 108 adapted to store the archived data. Repository 108 may be an optical storage medium, a magnetic storage medium, or a redundant array of integrated disks (RAID), or some other suitable storage medium.

A data storage system (DSS) 111 is illustrated within WAN 101 for online storage of data offloaded from system 114a or system 114b. DSS 111 is coupled to an external mass repository 112 adapted to store the offloaded data. Repository 108 may be an optical, magnetic, RAID, or some other type storage medium. System 111 may be part of a storage area network (SAN). A tape drive system 113 is illustrated in this example and represents another possible storage medium for storing data offloaded from system 114a or 114b.

In use of system 114a or 114b, data is written first to volatile memory at the top of the memory hierarchy. Metadata is associated with each data write to volatile memory. As data is written to the volatile memory a ranking engine (not illustrated) is utilized to rank the data written to volatile memory based on current write count (number of times that the same data has been written to the same memory). The least frequently written (LFW) data is represented in a table based on write count. Least frequently written data should not be confused with least recently used (LRU) data. The ranking engine does not take into consideration how often the data may be used. Data written to volatile storage having the lowest write count has the first priority in an offload or purge of data from the system.

A capacity threshold may be established for volatile medium 201, which is RAM in a preferred embodiment. The threshold represents the maximum allowable amount of data that can be stored in RAM before the memory is considered full. The capacity threshold may be considered a water mark indicating that the memory is full and cannot accept anymore writes. When this threshold value is breached, LFW data stored in volatile memory is copied from that memory and written to the next medium down in the hierarchy of memories. The memory blocks that held the copied data are marked free space and new writes may then be written to volatile memory, which is element 201 in FIG. 2. The LFW data remains tabled and ranked in the system and local address tables are updated to show the new data location for the offloaded data.

When the capacity threshold is again breached, more LFW data is copied from RAM and written to Flash to free up RAM to accept new data writes. A capacity threshold is also established for all of the other memories on board system 114 (a,b). Each memory has a place in the hierarchy such that when full, LFW data is copied from the memory and written to a next memory down in the hierarchy. Eventually the LFW data still qualified by low write count is purged from system 114 (a. b) or offloaded to some other storage such as DSS 107, DSS 111, or tape drive 113.

Figure 2:
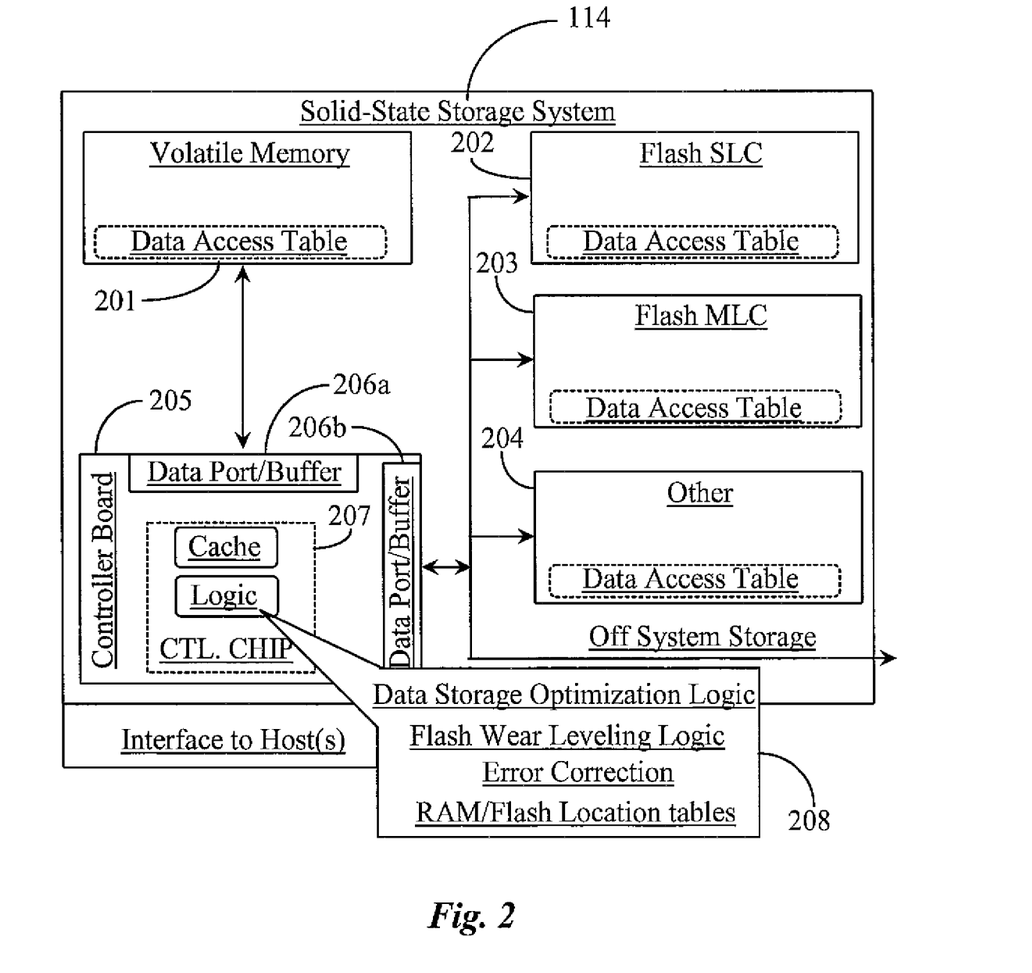
FIG. 2 is a block diagram illustrating a solid-state storage system according to an embodiment of the present invention.

FIG. 2 is a block diagram illustrating solid-state storage system 114 according to an embodiment of the present invention. Solid-state storage system 114 is analogous to systems 144a, and 114b described in FIG. 1. In one embodiment system 114 is an internal drive and is recognized as such by a computing host upon boot. In another embodiment the system is a transparent cache that is in-line with existing storage traffic. System 114 includes volatile memory 201 such as RAM, DRAM, SRAM, SDRAM, or some other variation of RAM having high-write speed. Memory 201 is the top memory in a hierarchal order of memories onboard system 114. Volatile memory 201 is hereinafter termed RAM memory for ease of distinction over other memory types on system 114.

RAM 201 includes a data access table containing the RAM local block addresses (RLBAs) of the data blocks provisioned on the device. Other addressing protocols may be used such as a page system. A controller board 205 is provided in system 114 and supports all of the chips and circuitry for enabling a solid-state controller for managing access to memory for reads and writes and for managing how data is stored and retained in the system. A controller chip 207 is provided on controller board 205. Controller chip 207 may be a field programmable gate array (FPGA), an application specific integrated circuit (ASIC) or another suitable IC. Chip 207 includes a small amount of RAM cache and logic 208. Logic 208 includes machine readable instruction for managing data on the system. Logic 208 includes, among other standard features, RAM/Flash data location tables enabling address lookup for read and write operations. A local block address (LBA) system is utilized in this example. A RAM LBA shall be termed (RBLA) and a Flash LBA shall be termed a (FLBA).

Logic 208 includes error correction (ECR) features and logic for wear leveling Flash devices to prolong mean time before failure (MTBF) of such devices. Logic 208 also includes data store optimization logic that provides a unique method for migrating LFW data on the system down the hierarchy of memories until it is eventually purged or offloaded from the system. The logic enables write ranking relative to write count of the data (number of times it has been written to the system). Data having low write count is ranked high for migration down to lower priority memories.

Controller 205 has an Interface to a host computing appliance such as one or more computing appliances or data processing servers (enterprise application). A bi-directional data port and buffer circuitry 206a is provided for enabling bidirectional read/write communication between the controller and RAM 201. Controller 205 has a data port and buffer circuitry 206b to enable bidirectional read/write communication to lower priority memories in the hierarchy of onboard memories. A Flash memory 202 of a next level down in the hierarchy is provided and is a non-volatile storage medium. In this example Flash memory 202 is a single-level cell (SLC) NAND Flash memory.

Flash SLC memory includes a data access table containing the FLBAs provisioned to the memory. A Flash memory 203 is the next memory down in the memory hierarchy on system 114 after memory 202. In this example, Flash memory 203 is a multi-level cell (MLC) NAND Flash memory. It should be noted herein that SLC Flash memory 202 is less dense, more expensive, and has a faster write speed that MLC Flash memory 203. For this reason, SLC Flash memory 202 enjoys higher priority than MLC Flash memory 203 in the memory hierarchy onboard system 114. Flash MLC 203 includes a local data access table containing the FLBAs provisioned to the memory.

A memory 204 labeled "other" is provided on system 114 and represents the lowest memory in the hierarchy of memories on system 114. Memory 204 may be another type of Flash memory that may be less expensive than other types used on system 114, or it may be the same as another type used. Memory 204 includes a local data access table containing FLBAs or LBAs consistent with the given memory type.

In this example, controller 205 may communicate with an off system storage through port 206b. Off-system storage might be any mechanical, optical, solid-state, or magnetic data storage system used primarily to backup data that is no longer required on a main or primary system such as system 114.

When a host writes to system 114, the controller writes the data into RAM 201 because of the fact that RAM has the highest write speed of any of the onboard memory types. The host will write to RAM exclusively as long as there is free space in RAM to accept the writes. When data is written to RAM a ranking instruction or engine establishes whether or not the data write is new or a repetitive data write. If the data write is new, the ranking engine creates and associates a small amount of metadata with the write. The metadata may be tagged to the end of the write. The metadata provides a faster lookup capability for a daemon process that looks for the data having the lowest write counts or LFW data. The metadata provides access to a global LFW table that contains current information about the LFW data and where in the system that data currently resides.

The program or daemon is triggered into action when a memory state reaches "full" as defined by a predetermined threshold. In this system it is critical that all writes from a host are written to RAM for best efficiency. However, RAM memory 201 may eventually reach the "full" threshold. The full state triggers the daemon process to find n entries of data in RAM where n may signify multiple data entries at multiple different RLBAs. The LFW table prioritizes all data entries in system 114 having the lowest write counts in ascending order. In this way the controller may quickly identify and access n numbers of data entries in RAM that have the lowest write counts. Therefore, when RAM is determined full, the process copies n numbers of data entries in RAM that have the lowest write counts. These entries are then written into Flash SLC, which is the second highest priority memory inboard system 114. The blocks that held the copied data are then marked free blocks so that the host may continue to write data directly to RAM.

The LFW data written to Flash SLC 202 will have new FLBAs and the RLBA table for RAM is updated to note newly freed RLBAs. As more data writes come in and data is copied from RAM and written to Flash SLC memory 202, the free space in Flash SLC 202 diminishes. When Flash SLC 202 becomes full, as defined by a pre-set threshold, the process is triggered to copy n data entries for Flash SLC 202 and write them into Flash MLC 203. The newly copied blocks are marked free to accept new data and the FLBA table is updated to note the free addresses.

As data writes continue to RAM and LFW data is migrated down the memory tree, Flash MLC 203 may eventually become full (threshold) as well. This state again triggers the process to copy n LFW data entries from Flash MLC 203 to the next memory down in the tree, more particularly, "other" memory 204 in this example. Memory 204 is not absolutely required to practice the invention. It is included in this example to illustrate the variant possibilities of including different memory types in the hierarchical memory tree on system 114.

In this example, LFW data is migrated from RAM down the memory tree until other memory 204 becomes full. This state triggers the process to copy n LFW data entries from other memory 204 and write the data to some off-system storage facility, which could be any type of data storage facility. In one embodiment the LFW data entries are simply erased from other memory 204. The process optimizes the overall efficiency of the system by preserving the high write speeds of RAM while allowing use of lower cost memory form factors to make up the total memory size of the system. Metadata associated with all of the data writes enables efficient lookup of current LFW data entries that should be subject to migration. In this system it should be noted that data is read from any current address of that data regardless of which memory the data resides on. Read speeds of Flash are comparable to that of RAM so the present invention is not relevant to the read efficiency of the system.

Figure 3:
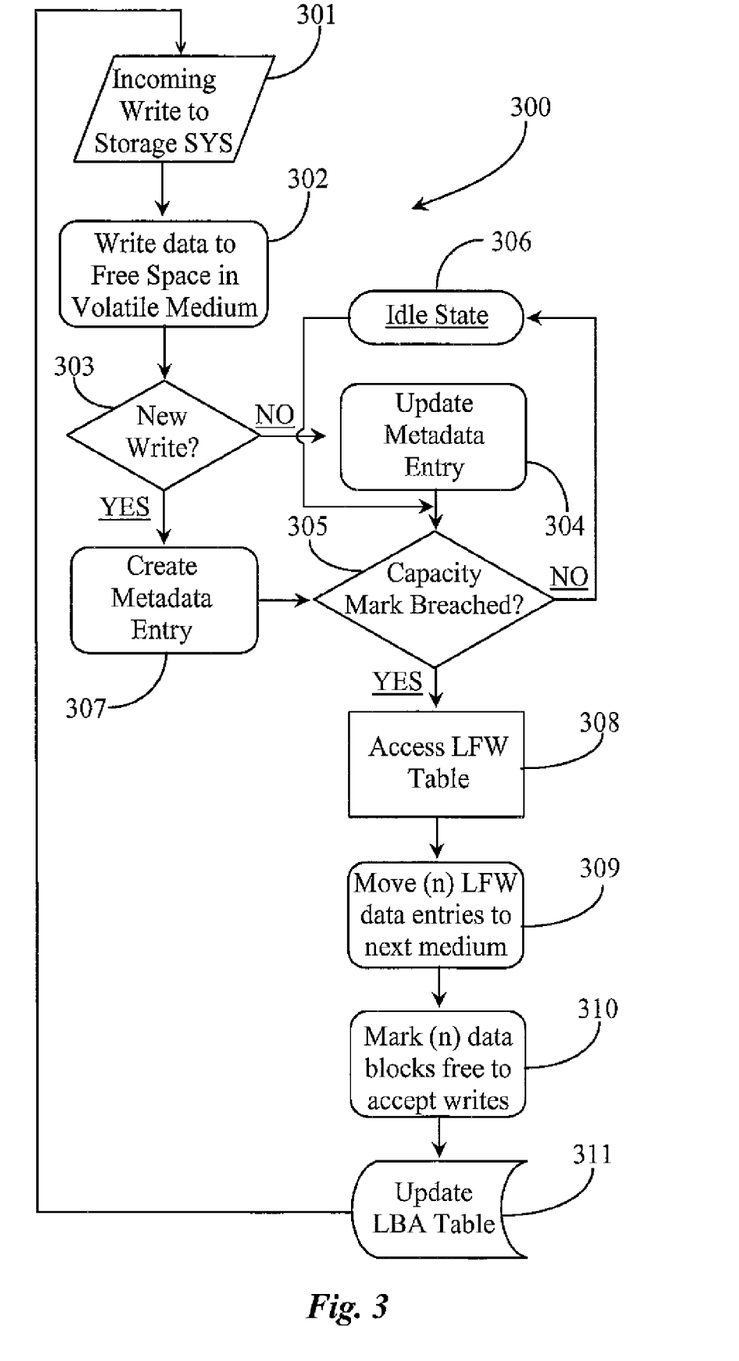
FIG. 3 is a process flow chart illustrating steps for moving least frequently written data from a higher order memory to a next lower order memory in a hierarchy of memories according to an embodiment of the present invention.

FIG. 3 is a process flow chart 300 illustrating steps for moving least frequently written data from a higher order memory to a next lower order memory in a hierarchy of memories according to an embodiment of the present invention. At step 301, an incoming write request arrives at the controller of the storage system. At step 302 the data is written to free space in the volatile medium, which is a variation of RAM in a preferred embodiment. RAM is the top memory in the hierarchal memory tree configured onboard the system.

At step 303 for each write, the system determines if the write is a new data write. If at step 303 the data is new, then at step 307 the system creates metadata for the write and associates the metadata to the data in the data write. Metadata may include a write count, LBA/FLBA address, a pointer to a current LFW table, and any other data that may be deemed important to aid in determining a number of LFW entries existing in any of the onboard memories. If it is determined at step 303 that the data write is not a new data write, then the metadata associated with the older write of the same data is updated to reflect the new write count.

Whether or not the write is a new or repeated write, the process moves to step 305 to determine if any capacity mark for any of the memories in the memory tree has been breached. If a memory full state is not detected, then the process for migrating LFW data remains at an idle listening state. The process may detect a full state of memory or it may be notified of a full state of memory by another process.

If a full state exists in an onboard memory such as RAM for example, the process looks at the LFW table in step 308, and identifies a number of LFW data entries existing in RAM. At step 309 the process orders n LFW data entries to be "moved" to a next lower priority medium in the memory tree such as SLC Flash memory for example. A move involves copying n number of entries and writing those entries into the lower priority medium, and then marking the blocks formerly hosting the data as free blocks. At step 310, the process marks n number of data blocks free to accept new writes. At step 311 the process updates the LBA table with the new addresses of the migrated data. The process is then complete for that write and resolves back to step 301 to process the next write.

Figure 4:
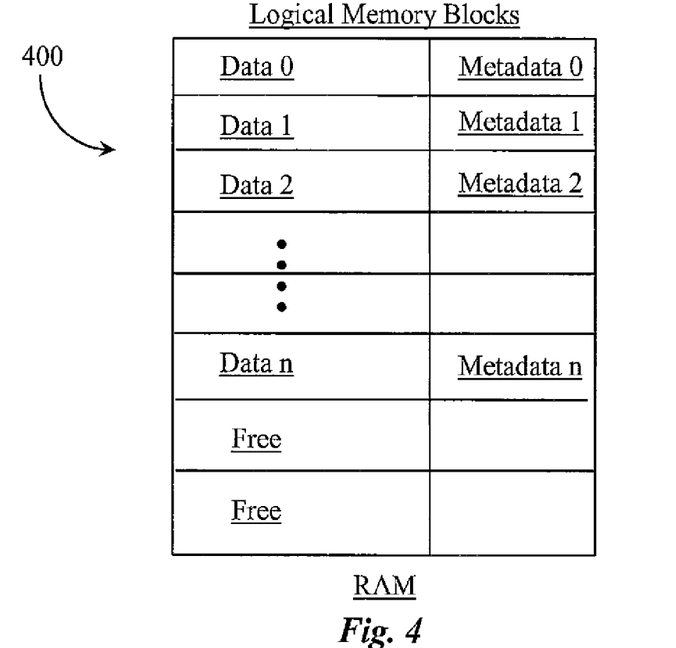
FIG. 4 is a block diagram illustrating a random access memory containing data and metadata associated with the data according to an embodiment of the present invention
Figure 5:
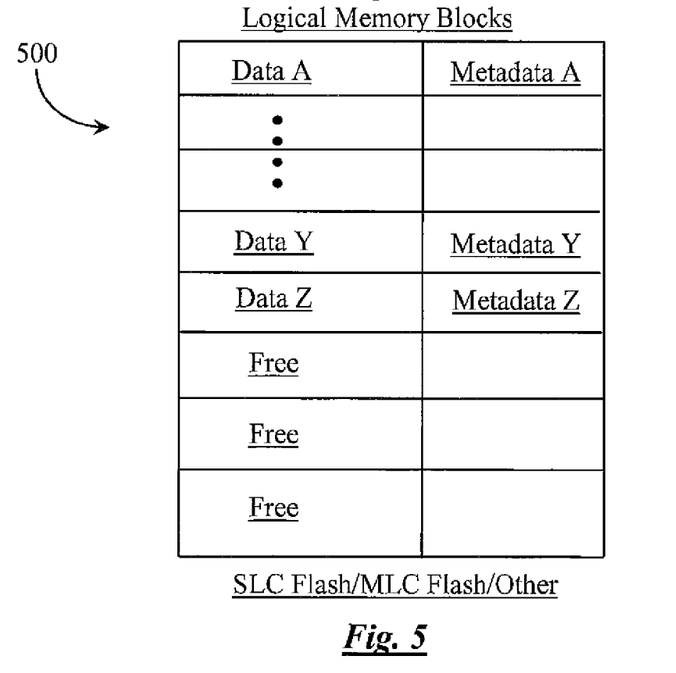
FIG. 5 is a block diagram illustrating a memory representing a lower priority memory containing data and metadata associated with the data according to an embodiment of the present invention.

FIG. 4 is a block diagram illustrating a random access memory 400 containing data and metadata associated with the data according to an embodiment of the present invention. FIG. 5 is a block diagram illustrating a SLC or MLC Flash memory 500 representing a lower priority memory containing data and metadata associated with the data according to an embodiment of the present invention. Referring now to FIG. 4, RAM 400 may be any of several different variations of RAM. RAM 400 is partitioned logically into memory blocks or, in one embodiment, pages if a page file system is used. Logical memory blocks in RAM 400 contain data 0 through data n in blocks that are addressed using an LBA addressing scheme. In this example metadata is associated with each data entry 0-n in RAM 400. The metadata is tagged onto the end of the data entry for each data entry. In this way the data entry can be quickly and efficiently classified in an LFW table, which may be contained in the metadata. Write count of each data entry might also be contained in the metadata for each data entry. Free blocks in RAM 400 are marked free and may be written to.

Referring now to FIG. 5, memory 500 represents a next memory in a hierarchy of memories that includes memory 400 of FIG. 4 as a top or root memory in the hierarchy. Memory 500 may be a SLC Flash memory if it is the next memory down in the hierarchy. Further down the tree, memory 500 may represent a MLC Flash memory or some other provided onboard memory. Memory 500 is partitioned logically into data or memory blocks containing data entries and metadata like RAM 400. The data in memory 500 includes data A through Data Z. Metadata entries A-Z are associated with data entries A-Z in memory 500. Blocks that are free to accept writes are marked free. LFW data stored in RAM 400 may be copied from RAM 400 and written to a next memory in the memory hierarchy, which may be memory 500 in the form of a Flash SLC memory. Data that remains LFW data may be migrated down the memory tree and eventually off of the system by data purge or offload to an external storage system. Wherever the LFW data is copied from, the system may mark the data blocks as free to accept new data. Since the definition of metadata is data about data, the metadata associated with actual written data entries on the system may describe certain attribute of the data entry such as LBA, write count, and any other summary or descriptive data that might be deemed prudent to create and associate with actual data entries.

If data entries 0-n of memory 400 are all LFW data entries, then when RAM is full, those n entries might be copied and written to memory 500. The copied blocks are then marked free to accept new data writes. An LFW table may be a global table that documents the least frequently written data for all of the onboard memory of the solid-state system. However, when the process detects a full memory, only LFW data entries from that memory are copied to a lower memory in the hierarchy. The process may be performed by batch meaning that multiple LFW data entries, for example, data 0 through data n would be copied from the full memory in one operation to provide a decent buffer of free blocks for continued writes to RAM.

Figure 6:
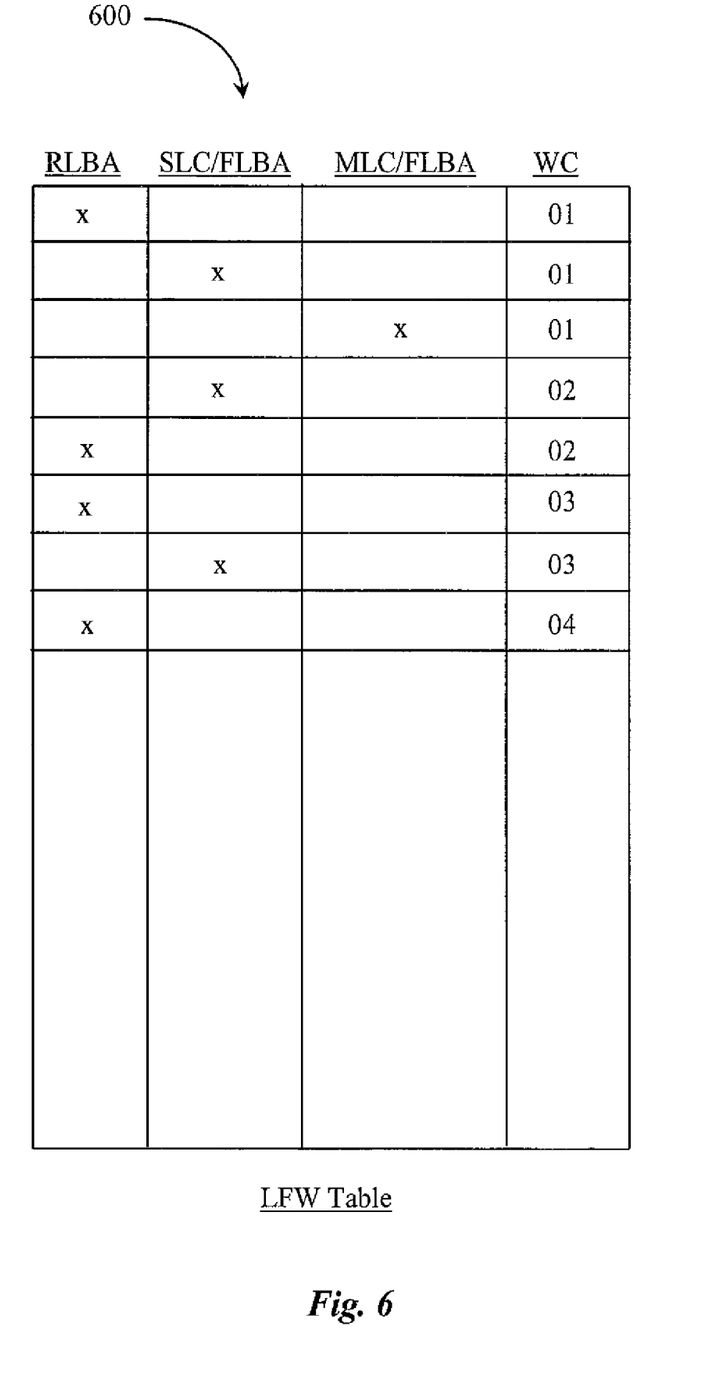
FIG. 6 is a block diagram illustrating a least frequently written data table according to an embodiment of the present invention.

FIG. 6 is a block diagram illustrating a least frequently written data table 600 according to an embodiment of the present invention. Data table 600 represents a global LFW table that identifies the address and write count of data entries stored within the solid-state system. Table 600 is logically represented in this example and is partitioned into columns and rows. The first column headed RLBA contains address information for RAM data entries considered least frequently written. A second column contains data entries that reside in SLC Flash and therefore have FLBA addressing. A third data column contains data entries into MLC Flash and has FLBAs.

Each data entry includes the write count for qualification as LFW data. In one embodiment the ranking engine simply sorts the LFW data entries in LFW table 600 by lowest write count in ascending order. In this example the table is global and holds the information for all of the data considered LFW data for all of the onboard memories in the memory hierarchy. In another embodiment each physical memory has its own LFW table. For purposes of discussion, x indicates the presence of data at an address in the system and for each data entry, the write count is provided.

It may be that the system imposes a maximum on number of times that the data has been written to consider the data LFW data. In one aspect this is calibrated after taking into consideration an average same-data write count and stipulation that any data having a lower WC than an average write count might be classified as LFW data. In another embodiment the LFW data is considered comparatively with all of the current data in memory.

It will be apparent to one with skill in the art that the solid state system including the data migration process of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A hierarchical data storage system comprising:
   a random access memory (RAM) receiving all initial memory writes for the hierarchical data storage system;
   a first non-volatile storage medium; and
   a controller including a ranking engine tracking counts of only data writes for data in the RAM and only data writes for same data in the first non-volatile storage medium;
   wherein the RAM and the first non-volatile storage medium is associated with a pre-set capacity threshold, and the controller, upon the RAM reaching a first pre-set capacity threshold, identifies, based on the counts, one or more first blocks of first data as lowest write count to the RAM, copies the first data in the one or more first blocks to the first non-volatile storage medium, and marks the one or more first blocks as available for new data writes, and the controller, upon the first non-volatile storage medium reaching a second pre-set capacity threshold, identifies, based on the counts, one or more second blocks of second data as lowest write count to the first non-volatile storage medium, and marks the one or more second blocks as available for new data writes from the RAM.

2. The hierarchical data storage system of claim 1 wherein the controller, prior to marking one or more second blocks of the first non-volatile storage medium available for data writes, first copies the second data in the one or more second blocks to a memory remote from the hierarchical data storage system.

3. The hierarchical data storage system of claim 1 comprising a second non-volatile storage medium subordinate to the first non-volatile storage medium and associated with a third pre-set capacity threshold, and the controller, upon the first non-volatile storage medium reaching the second preset capacity threshold, identifies, based on the counts tracked by the ranking engine, the one or more second blocks of second data as lowest write count to the first non-volatile storage medium, copies the second data in the one or more second blocks to the second non-volatile storage medium, and marks the one or more second blocks as available for new data writes, and the controller, upon the second non-volatile storage medium reaching the third pre-set threshold, identifies, based on write counts by the ranking engine of only data writes for same data writes in the same second non-volatile storage medium, one or more third blocks of third data as lowest write count to the second non-volatile storage medium, and marks the one or more third blocks as available for new data writes from the first non-volatile storage medium.

4. The hierarchical data storage system of claim 3 wherein the controller, prior to marking the one or more third blocks of the second non-volatile storage medium as available for data writes, first copies the third data in the one or more third blocks to a memory remote from the hierarchical data storage system.

5. The hierarchical data storage system of claim 3 wherein the second non-volatile storage medium is a multi-level cell (MLC) Flash memory.

6. The hierarchical data storage system of claim 3 wherein lowest write count data copied from any of the first non-volatile storage medium and the second non-volatile storage medium is written to a next storage medium down in the hierarchical data storage system.

7. The hierarchical data storage system of claim 1 wherein the first non-volatile storage medium is a single-level cell (SLC) Flash memory.

8. The hierarchical data storage system of claim 1 wherein the controller associates metadata table entries to written data entries, the metadata table entries including local block address information and current lowest write count data state of each of the written data entries.

9. A method for utilizing flash memory in a memory system, comprising steps of:
   (a) making all memory writes in the memory system to a random access memory (RAM) while tracking frequency of only identical data writes within the RAM;
   (b) setting a first capacity threshold for the RAM, and tracking a first capacity of valid data in the RAM;
   (c) when the first capacity reaches the first capacity threshold, identifying at least one first block of first lowest write count data, and copying all of the first lowest write count data in the at least one first block to a first flash memory; and
   (d) marking the at least one first block as available to be written in the RAM.

10. The method of claim 9 further comprising steps for setting a second capacity threshold for the first flash memory, tracking a second capacity of valid data in the first flash memory and identical data writes within the first flash memory, and when the second capacity for the first flash memory reaches the second capacity threshold, identifying at least one second block of second data as lowest write count and marking the at least one second block as available to be written in the first flash memory.

11. The method of claim 10 including a second flash memory subordinate to the first flash memory and further comprising steps for setting a third capacity threshold for the second flash memory, tracking a third capacity of valid data in the second flash memory and identical data writes within the second flash memory, and upon the first flash memory reaching the second capacity threshold, identifying one or more second blocks of second data as lowest write count to the first flash memory, copying the second data in the one or more second blocks to the second flash memory, and marking the one or more second blocks as available for new data writes, and, upon the second flash memory reaching the third capacity threshold, identifying one or more third blocks of third data as lowest write count to the second flash memory, and marking the one or more third blocks as available for new data writes from the first flash memory; thereby creating a hierarchical data storage system.

12. The method of claim 11 including steps for, prior to marking the one or more third blocks of the second flash memory as available for data writes, first copying the third data in the one or more third blocks to a memory remote from the memory system.

13. The method of claim 11 wherein the second flash memory is a multi-level cell (MLC) Flash memory.

14. The method of claim 11 wherein least-frequently-written data copied from any of the first flash memory and the second flash memory is written to a next storage medium down in the hierarchical data storage system.

15. The method of claim 9 wherein the first flash memory is a single-level cell (SLC) Flash memory.

16. The method of claim 9 wherein metadata table entries are associated to written data entries, the metadata table entries including local block address information and current lowest write count data state of the associated written data entries.

* * * * *